Feb. 18, 1969  B. U. SCARABELLO ET AL  3,428,054
FILTER
Filed Oct. 18, 1965

INVENTORS,
BRUNO U. SCARABELLO
EMILIO A. PEREZ
LLOYD G. WELTY &
BY SIMON J. SLUTER

ATTORNEYS

United States Patent Office 3,428,054
Patented Feb. 18, 1969

3,428,054
FILTER
Bruno U. Scarabello and Emilio A. Perez, Walnut Creek, Lloyd G. Welty, Beverly Hills, and Simon J. Sluter, Los Angeles, Calif., assignors to Chemway Filters, Inc., Office of Beko and Lemon, County Court House, Nye County, Nev., a corporation of Nevada
Filed Oct. 18, 1965, Ser. No. 496,973
U.S. Cl. 131—265          12 Claims
Int. Cl. A24f 7/04; A24d 1/06; A24b 13/00

ABSTRACT OF THE DISCLOSURE

A filter is described which is particularly effective in filtering tobacco smoke. The filter comprises a composite mixture of mineral aggregate particles having highly irregular surfaces which include concavities, and particles of an absorptive material such as of a clay. The particles are bonded together by a suitable bonding agent such as a sugar or dextrin and the composite is disposed within a metal sleeve. The resulting filter is disposed in the path of the tobacco smoke before it reaches the smoker. The tobacco to be smoked can also be coated with clay for more effective filtering, and a cellulose acetate filter can be disposed at the exit end of the mineral-absorptive particle filter to remove acidic components from the smoke.

---

This invention relates to a filter and, more particularly, to an improved filter for tobacco smoke.

As is known, tobacco smoke is comprised of several hundred chemical components or constituents, some of which are considered harmful to smokers. These components are in the form of particulate matter, condensates, and gases. As was pointed out in the recent United States Department of Health and Welfare Bulletin No. 1103 on Smoking and Health, cigarette smoke is a heterogeneous mixture of gases, uncondensed vapors, and particulate matter. Laboratory evidence clearly indicates that tobacco smoke includes a number of potent carcinogenic compounds, and it is therefore desirable to remove as many of such constituents as possible. To this end, various materials and methods have heretofore been utilized to filter the smoke before it reaches the smoker. For example, plain and activated charcoal are commonly used as filtering media. While charcoal filters remove some of the components from tobacco smoke, they are not as effective as desired in that they allow passage of some of the harmful constituents. Moreover, charcoal produces filtration by an adsorption process. That is, the components of smoke removed by charcoal are done so by adherence to the surface of the charcoal as the smoke passes through the filter. It will be apparent that the amount of surface area of charcoal available to adsorb the components is inversely related to the amount of smoke that has already passed through the filter. Thus, in a cigarette, for example, as more of the cigarette is smoked, less of the tobacco smoke constituents can be removed from the smoke since the charcoal surfaces become saturated or covered. Hence, the ability to remove volatile components by adsorption diminishes as the cigarette is consumed. Furthermore, removal of volatile components from the smoke is by adsorption, and the heat capacity of charcoal is far too small to provide effective cooling and attendant condensation of a significant fraction of the volatile components.

Cellulose acetate is another material commonly used as a filtering media. This material, however, generally is only capable of partially removing the acidic constituents of tobacco smoke which are considered to be carcinogenic or otherwise harmful to a smoker, and there are others which are alkaline. These are ordinarily not removed by a cellulose acetate filter. Moreover, as in the case of charcoal, the density and consequently the heat capacity of cellulose acetate or similar fibrous filter materials is much too low to efficiently condense undesired vapors. Obviously, filters having both cellulose acetate and charcoal are no better in condensing volatiles than either material alone.

The chemical composition of tobacco smoke, methods of analysis thereof, a tabulation of the chief carcinogenic compounds in tobacco smoke, and their origins are discussed in detail in the aforesaid Department of Health and Welfare Bulletin #1103.

Briefly, the carcinogenic agents in tobacco smoke are found as volatiles in the gaseous phase of the smoke, as well as in the form of solids (sols) which are suspended in the smoke. Some of the carcinogens are found in the unburned tobacco leaves and are liberated and volatilized as the tobacco burns. A major group of carcinogens is formed by pyrolysis in the combustion zone of the burning tobacco at temperatures as high as 1500° F. Recent research indicates that still other agents are extracted from the tobacco shreds by hot smoke from the combustion zone passing over unburned tobacco in the smoking process. These agents are now believed to be particularly harmful in that they include agents which catalyze and enhance the carcinogenic processes and activity of other carcinogens which may act in a synergistic manner to potentiate other carcinogens. As stated in the aforementioned Bulletin #1103 "The overall carcinogenic potency of tobacco tar is many times the effect which can be attributed to substances isolated from it."

From the foregoing, it can be seen that the quantity of harmful compounds reaching the smoker can be effectively reduced if undesired compounds produced and introduced into the smoke is reduced, if undesired volatiles can be cooled so as to condense, and if the condensed droplets as well as particulate components can then be trapped before they reach the smoker's mouth. The present invention provides for the accomplishment of the foregoing, and does so while improving the taste and mellowness of the tobacco smoke and not requiring significantly greater effort in drawing the smoke. Features of the present invention include low cost of raw material, fabrication simplicity, effective filtering, easy draw, and an improved taste of the tobacco smoke.

Accordingly, it is an object of the invention to provide improved filtering of fluids, particularly filtering of gases such as tobacco smoke.

Another object of the invention is to provide for filtration of tobacco smoke in a manner which will cause a greater amount of the particulate matter and volatile substances to be removed from the smoke than in prior filtering methods.

A further object of the invention is to provide a filter media having a multitudinous concave and convex surface portions formed of a dense material with a higher heat capacity than charcoal, for example, thus cooling and condensing a larger proportion of condensables from tobacco smoke.

A further object of the invention is to provide an improved means of tobacco smoke filtering wherein the smoke is cooled to condense components, undesirable components are removed therefrom, and the filtering effect is not cumulatively diminished by the passage of smoke therethrough.

Still another object of the invention is to provide a tobacco smoke filter which will present a large effective filtering in situ surface area to the smoke and yet does not deleteriously affect the draw or taste of the smoke.

A still further object of the invention is to provide a filter for tobacco smoke which reduces the content of alkaline as well as acidic components of tobacco smoke.

Still another object of the invention is to provide an in situ tobacco smoke filter in which both the ignited and unconsumed portions thereof function as filtering media so that all of the unburned portion will continue to filter the smoke until all of the tobacco is consumed.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to the drawing.

Figure 1:
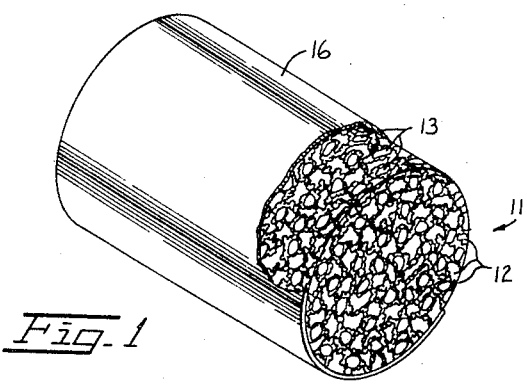
FIGURE 1 is an enlarged perspective view of a filter of the invention with portions thereof broken away to illustrate the construction thereof.

In general the present invention provides a filter system for removal of undesirable particulate and volatile constituents from tobacco smoke, and comprises in its most effective aspects a combination of a "filter coating," i.e., in situ filter medium which is disposed on the surfaces of the tobacco leaf particles or shreds and a "terminal filter" which extends across the portion of the passageway of the smoke between the tobacco containing area and the smoke inhalation end, i.e., tip in a cigarette or mouth piece of a pipe.

As used herein, the term "filter coating" denotes a layer or covering of material applied to surface portions of the tobacco particles and serving to absorb various components from the surrounding or passing smoke. The coating of the invention comprises, in general, finely divided particles of absorbing material disposed on the surface of the tobacco particles as by means of a suitable innocuous binder with some of the particles of absorbing material possibly disposed in the interstices between the tobacco particles. The term "innocuous" binder as used throughout the specification means a binder such as a sugar or dextrin which is harmless to humans and does not generate materials harmful to humans when it is subjected to heat.

The so-called terminal filter comprises relatively coarse aggregate particles of a mineral substance. Desirably these aggregate particles are in a composite mixture with usually much finer particles of an absorbing material. The absorbing material which we have found well suited for the present purpose for the terminal filter as well as for the filter coating is what may be the termed finely-divided inorganic clay-like materials. Clays are ordinarily considered to be pure and impure hydrous silicates of alumina. For the purpose of the present invention, the term clay is used in the broad sense and is intended to denote the common swelling and non-swelling clay minerals, i.e., the kaolinite clays, fuller's earth, montmorillonite clays, and illite type of clays, etc., as well as natural and synthetic clay like substances characterized by high absorptivity, high or irregular surface area, and having a particle size of generally less than about 0.01 mm. Other materials can be included with the clay in the filter coating, for example, diatomaceous earth or other finely divided silica, alkaline earth oxides, e.g., CaO and MgO, carbonates such as $CaCO_3$, $MgCO_3$, and other materials fusible therewith. The medium employed should possess the ability to filter in the unheated state and to possess the ability to retain pyrolytic and vaporized material in the combustion zone of the smoking device. It is considered other inorganic substances may be selected to perform the functions as discussed hereinafter.

The following types of clays may be included in the coating of our invention, namely:

(1) Kaolinites (acid):
  Kaolinite
  Dickite
  Nacrite
  Halloysite
  Anauxite
  Allophane (2) Montmorillonites (basic):
  Saponite
  Nontronite
  Hectorite
  Beidellite (3) Illites:
  Includes micaceous varieties of clay.

One especially effective clay for the purposes of the invention is a bentonite containing lower amounts of silica and larger amounts of alumina, calcium, magnesia, sodium and potassium shown in the following comparative analysis with Wyoming bentonite:

| Preferred Bentonite Clay | Wyoming | Bentonite, percent |
| --- | --- | --- |
| Silica ($SiO_2$) | 47.62 | 61.94 |
| Aluminum Oxide ($Al_2O_3$) | 17.22 | 15.97 |
| Iron Oxide ($Fe_2O_3$) | 4.26 | 2.92 |
| Calcium Oxide (CaO) | 7.27 | 1.72 |
| Magnesium Oxide (MgO) | 4.85 | 2.45 |
| Sodium Oxide ($Na_2O$) | 2.62 | 1.65 |
| Potassium Oxide (K O) | 2.48 | .29 |
| Loss on Ignition | 3.77 | |
| Trace element and $H_2O$ | 9.91 | 13.10 |

The bonding agents for adhering the finely dived clay to the tobacco surfaces are innocuous organic substances such as sugars, dextrin, starch, and other synthetic and natural carbohydrate gums.

The mineral aggregate used in the "filter tip" portion or terminal filter portion is generally selected on the basis of density and heat capacity. Mineral materials such as scoria, slag, glass, obsidian and the like have been found to be highly satisfactory in this regard; scoria and slag being especially effective in view of the large surface area thereof produced by the multiplicity of open cells and cavities which act as condensers or traps. Desirably the terminal filter has associated therewith a cellulose acetate filter which as mentioned before is effective for diminishing the content of acidic compounds in the smoke.

In accordance with the present invention, removal of harmful components from tobacco smoke is accomplished in what may be regarded as three definite stages, to which may be desirably added the conventional cellulose acetate filtration as a fourth stage. Briefly described, the stages are as follows:

In the initial stage, which is in the burning zone of the tobacco, the clay of the in situ coating filter absorbs components liberated from the smoke during combustion. The clay is converted into a matrix of ceramic-like material at the combustion temperature and remains as a dispersed matrix in the ash along with the absorbed compounds. This absorption of compounds, in situ, in the combustion zone diminishes the quantity of compounds released into the emergent smoke stream. Moreover, the clay reduces the combustion temperature in the burning zone, thus inhibiting the formation of the pyrolytically generated carcinogens. The inorganic matrix may also promote more effective combustion which will reduce the proportions of pyrolyzed compounds and polymers in the smoke.

In what may be called the second stage or phase, the smoke which has been released from the burning tobacco proceeds on its course and passes through the tobacco awaiting to be burned. During such passage, the filter coating on the tobacco shreds absorbs particulates as well as volatiles from the smoke. Besides such absorption, the coating acts as a partial mechanical and chemical barrier to vaporization of the components which are normally extracted from the unburnt tobacco by the hot smoke passing over it. In other words, the components in the tobacco which are thought to initiate carcinogenic processes in the body are prevented from freely entering the smoke stream by a physical barrier as well as by the absorbing action of the filter coating and possible heat shielding provided by the inorganic surface filter coating.

In the third stage, the smoke reaches the terminal filter which contains the dense mineral aggregate and absorptive clay mixture. In this section the smoke rapidly gives up heat energy to the dense aggregate particles as it flows along the small irregularly winding passages between the clay and aggregate particles. As the smoke temperature drops due to the heat transfer to the aggregate, components of the smoke condense and are trapped in the concavities of the mineral particles or are absorbed by the randomly located clay particles in a process akin to fractional distillation. In addition, the aggregate particles of this third stage mechanically trap the particulate, i.e., sol portion of the smoke. It will be appreciated that the absorptive clay material is also an effective filter in the terminal filter stage as noted hereinafter.

Where the cellulose acetate filter section is utilized as a final stage, the smoke will pass through the cellulose acetate filter section where filtering of acidic smoke constitutents will take place. The acidic portion of the smoke includes such acidic carcinogens, e.g., phenolic compounds, as well as non-acidic carcinogens which may be entrained by otherwise relatively harmless acidic carrier compounds.

The present filter system is most effective when the in situ filter coating and terminal filter are used in combination to obtain an enhanced cooperative effect. However, it is appreciated that the filter coating as well as the terminal filter significantly reduces the concentration of harmful constituents independent of one another.

Figure 2:
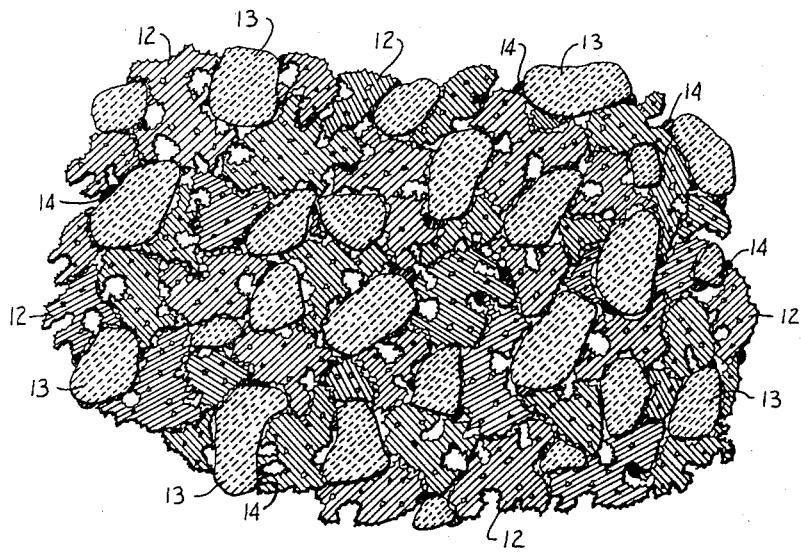
FIGURE 2 is an even further enlarged view of a portion of the filter of FIGURE 1.

For a more particular description of the terminal filter portion of the invention, reference is now made to the drawing. In FIGURES 1 and 2, a composite cylindrical filter body of the invention is generally indicated by the reference numeral 11. Such cylindrical filter is comprised of packed aggregate mineral particles such as scoria, slag, or other natural or synthetic mineral particles 12, having interstices therebetween, and a quantity of finely divided absorptive particles 13 such as agglomerated clay or clay-like material of the character described are disposed interproximately in said interstices. The composite of particles 12 and 13 may be bonded together by a suitable bonding agent 14. The bonding agent can be of any non-toxic type such as the carbohydrate types set forth above. A preferred construction includes a thin heat conducting sleeve or tubing 16 (shown broken away) which surrounds the bonded composite of particles. Desirably, the sleeve is of a thin metal foil such as aluminum, tin, copper, etc. Tubing 16 may also be used as a container with particles 12 and 13 packed loosely therein, and bonding agent 14 may be omitted.

Filter 11 is positioned to intercept tobacco smoke from the burning tobacco before it reaches the smoker. For example, if it is utilized in a cigarette, it may be utilized as the mouthpiece at the inhalation end of the cigarette. If it is to be utilized in conjunction with a cigarette holder or pipe, it can be placed in the stem thereof in the same manner as conventional filters.

The combination of the aggregate mineral particles and the particles of absorptive material provides for highly effective filtering. More particularly, aggregate mineral particles such as volcanic scoria, and slag particles, have very irregular surfaces such as shown in FIGURE 2, and described in Patent No. 2,925,831, issued to Lloyd G. Welty et al. This results in each particle having a relatively large surface area for its size. Because of this, the filter presents a maximum of surface area for contact by the smoke in passing through the filter and thus enhances the removal of components from the smoke, especially particulate matter and condensates. Further, as indicated, the surfaces of the scoria and slag particles 12 are, for a large part, defined by relatively deep concavities with the exposed openings thereto frequently having less area than the cross-sectional area within the cavity. These cavities are effective, not only to collect and trap condensates and particulate matter from the smoke, but in addition to provide multidirectional paths and channels through the filter creating modified venturi and centrifuge effects. It has also been ascertained that small glass globules or other high density particles having reverse concavities are likewise effective in promoting the condensation and trapping of the undesired materials. Because of the multidirectional paths and channels produced by the concave and convexly shaped cooling surfaces, it has been found that smoke passing through a filter of the invention travels a path of between two and three times the distance travelled by the smoke passing through a charcoal filter of comparable dimensions. The smoke travels this extra distance without any noticeable change in the suction power required to draw smoke through the filter.

As previously mentioned, the aggregate mineral particles utilized in the filter of the present invention are denser than materials which heretofore have been used in filters. Because of such high density, these particles have a relatively high heat capacity and therefore extract a large amount of heat from the smoke as the latter passes through the filter and comes into contact with the particles. This results in the smoke reaching the smoker at a lower temperature than with filters of conventional materials. Further, because of this lower temperature, many undesirable components of the smoke which would not condense by conventional filters are condensed by the filter of the present invention.

Sleeve 16 further enhances the cooling of the smoke since the mineral particles 12 are generally in contact with one another and conduct heat from within the filter to such sleeve. The sleeve then acts as a radiator to dissipate the heat. It also directly cools any smoke adjacent to the periphery of the filter which comes into contact with it. It will be evident that because of the high absorbing property of the particles 13, each particle will assimilate and retain smoke components throughout its mass rather than merely collecting smoke components on the outer surface of the particles. Further, absorption involving irreversible chemical changes as achieved herein is much more effective in removing volatile components from the smoke than is adsorption, simple pH changes or other processes.

It is important to note that the mineral particles 12 and the absorptive particles 13 coact in removing components from the smoke. As will be noted the mineral particles cool, condense and retain the smoke components. On the other hand, undesirable components which are not condensed by the mineral particles are absorbed and trapped by the clay particles in the filter body. Furthermore, due to the irregular and tortuous path which the smoke is required to travel through the filter because of the configuration of the mineral particles 13, the smoke will be in contact with the absorptive particles for a relatively long time to promote the removal of volatile components therefrom. Because of the large surface area and high heat capacity of the mineral particles, and the high absorptive capacity of the absorptive particles, the filter will be capable of treating a relatively large amount of smoke with use of a small amount of the filtering materials.

As may be evident the quality of filtering action by the present invention, as well as the amount of suction necessary to draw smoke therethrough, is dependent upon the size of the aggregate particles. It is to be appreciated that as the particles are made smaller the amount of suction necessary to draw the smoke through the filter will be increased for a given length of filter. Conversely, as the particles are increased in size, less surface area is provided for contact by the smoke and thus the filtering action will be decreased. It has been found that desirably both the scoria or slag particles and the absorptive particles should be of approximately the same size. Particles of sizes within the range between 1/16 of an inch and 90 mesh have been found to be satisfactory. The exact size will depend upon the dimensions of the filter and the particular type of tobacco smoke to be filtered. For example, it has been found that for a cigarete filter of conventional length, i.e., 7 mm. to 10 mm., agglomerate particles within the range of 20 to 90 mesh provide optimum filtering without adversely affecting the draw of the cigarette. The clay material is in the unfired finely divided form customarily supplied for various uses.

The filter tip of the invention is made of particles of the desired size of scoria or slag and clay mixed together in approximately equal proportions. Then, an organic binder such as one of the previously noted carbohydrate types, gums, etc., is added to the mixture in the proportion of 2% to 5% by volume of the composite particles. Finally, water also in the proportion of 2% to 5% by volume, is admixed therein.

The resulting mixture is poured or packed into elongated molds which have a width somewhat greater than the desired width of the finished filter, or poured directly into the metal tubing 16 or similar tip form which is to surround the filter. The mixture is then baked for approximately 20 minutes at a temperature, e.g., around 350° F. to evaporate moisture. After cooling, the resulting hardened filter blanks are removed from the molds, and cut to the desired length.

It is sometimes advantageous to provide the filter of the invention with the particles in a loosely packed unbonded state in said tip. In such an instance, tube 16, besides serving as a heat sink, provides a container for the particles. Discoidal shaped porous paper or cellulose acetate plugs are then provided in at least the mouthpiece end of the tube to maintain the loose particles therewithin.

The effectiveness of the filter of the invention has been demonstrated in tests with cigarettes. In such tests, the amount of tar and other residue remaining in the smoke after it passed through a cigarette provided with the filter of our invention and cigarettes provided with activated charcoal and cellulose acetate filters was compared. The filter of the invention tested was comprised of scoria of the particle size noted above and colloidal clay agglomerate particles of a size of about 20–90 mesh. The following table presents test results:

TABLE 1.—ALIQUOT SAMPLING

[One part of Eight]

| Filter | Filter Dimensions | Residue Collection Media | Residue Wt. (Grams) | Comparative Results, percent |
|---|---|---|---|---|
| Scoria and Clay | 13 mm. diam | Whatman Paper #1 | .0111 | |
| Cellulose Acetate | do | do | .0165 | 37 |
| Activated Charcoal | do | do | .0186 | 67 |

As can be seen from the table above, the filter of the invention removes up to 37% more condensible and particulate materials from smoke than cellulose acetate filters, and up to 68% more condensible and particulate materials from smoke than charcoal filters.

As previously stated, for further filtering of the smoke the filter of our invention can be used in conjunction with a cellulose acetate filter. Such a cellulose acetate filter should be positioned to receive the smoke after it passes through the filter of the invention. Desirably, when so used, it should be of a shorter length than is conventional, e.g., preferably 4 mm. to 5 mm. in length. By combining the cellulose acetate filter with the filter of the present invention, additive advantages of both are obtained.

Figure 3:
FIGURE 3 is a cross-sectional view of a cigarette incorporating the filter of FIGURE 1 and having a fine clay coating on the tobacco shreds in the cigarette.
Figure 4:
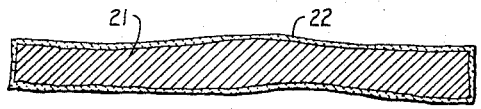
FIGURE 4 is an enlarged view of a shred of tobacco from the cigarette of FIGURE 3, depicting a fine clay coating thereon.

For a more detailed explanation of the coating type of filter of the present invention, reference is now made to FIGURE 3, which depicts a single shred 21 of tobacco. As illustrated the surfaces of the shred 21 are coated with a layer 22 of finely divided absorptive clay-like material, of the type hereinbefore enumerated. The clay is retained on the tobacco surfaces with an organic binder such as a sugar, for example, dextrose monohydrate, applied as described above. It is to be understood that the layer is much thinner in proportion than is shown. In addition, the layer does not necessarily completely encase the shred.

It has been found that the provision of such a fine layer of clay does not affect the smoking taste. Besides providing filtration, as will be described hereinafter, the coating of clay acts as a partial physical barrier to greatly reduce contact between the unburned tobacco and the smoke as it passes through the tobacco. Also, the barrier inhibits premature volatilization of the compounds in the tobacco. On the other hand, any migration of volatilized compounds across the clay layer is diminished by the clay. Thus synergistic or catalytic activating action of the tobacco smoke components by components of the unburned tobacco is inhibited and the amount of undesirable components from the unburned tobacco present in the tobacco smoke is reduced.

The clay is applied to the tobacco before it is rolled into a cigarette. Preferably the clay is first finely powdered to varying from 400 to 1000 mesh in size. The powdered clay is then mixed with an innocuous binder such as dextrose monohydrate, tolu balsam syrup, or other invert sugar, with the ratio by weight of from 5 to 10 parts of clay to one part binder. It may be desirable to incorporate the coating during the sugar curing of the tobacco itself, whereby the sugar of the curing agent may be used to adhere and distribute a clay additive on the surfaces of the tobacco shreds. The clay-binder mix can be sprayed or otherwise applied to the shredded tobacco. Between 10 to 20 parts by weight of the clay-binder mix to 100 parts of tobacco has been found to provide effective filtering and to make the taste of the smoke milder. For use in pipe type smoking devices the treated tobacco may be packaged as usual.

The composite filter system of the invention comprising the coating filter in combination with the terminal filter is depicted in FIGURE 3 and is generally indicated therein by the reference numeral 17. Besides a filter 11 of aggregate mineral particles 12 and absorptive material particles 13, a cellulose acetate filter 18 as discussed above is provided at the inhalation end 23 of the cigarette. The tobacco 19 is coated with a thin layer of finely powdered clay of a swelling or non-swelling variety.

It will now be clear that cigarette 19 provides filtering for the full length of the tobacco. Filtering takes place at the cigarette burning zone during smoking. That is, some of the components, particularly particulate matter and volatile substances, are absorbed by the clay from the tobacco being burned in situ, thereby diminishing the compounds formed by pyrolysis as pointed out above. These absorbed and/or condensed smoke components and the clay remain in the ash of the cigarette and, therefore, do not reach the smoker. As the smoke from the burning tobacco passes through the tobacco, many of the components are absorbed by the clay on such tobacco. Further, as mentioned before, the clay acts as a barrier in preventing heat released components of the unburned tobacco from being extracted by the smoke through a potentiating effect thereon. As a result of the provision of the fine layer of clay on the tobacco, when the smoke reaches the composite particle filter 11, it has already been partially filtered. Thus, after passing through filter 11 and then through the cellulose acetate filter 18 and being filtered as above described with respect to FIGURES 1 and 2, the residue remaining therewithin to affect the smoker has been appreciably diminished. The four stage filtration of the present invention thus provides for substantially lowered exposure to the hazardous tar and vapors normally present in tobacco smoke, including the carcinogenic constituents found therein.

It is to be appreciated, of course, that while the filter of the invention is particularly suitable as a tobacco smoke filter, it can be used for filtering fluids, gases and vapors other than tobacco smoke.

What is claimed is:

1. A fluid filter comprising a composite mixture of aggregate mineral praticles, and particles of an absorptive material having an absorbing affinity for a substance to be removed from a fluid, said aggregate mineral particles having irregular surfaces including concavities to provide an extended surface area over which the fluid passes and to collect from such fluid condensates and particulate matter.

2. A fluid filter according to claim 1 wherein said aggregate mineral particles are selected from the group consisting of scoria, slag, obsidian, and glass.

3. A fluid filter according to claim 1 wherein said aggregate mineral particles and said particles of an absorptive material are of a mesh screen size of $\frac{1}{16}$ inch to 90 mesh.

4. A fluid filter according to claim 1, wherein said mineral particles and absorbing particles are present in about equal proportions.

5. A filter for removing condensibles, particulate matter and volatile substances from a gas comprising a composite mixture of aggregate mineral particles, and particles of an absorptive material, said aggregate mineral particles having irregular surfaces including concavities to provide an extended surface over which the gas passes and to collect from such gas condensates and particulate matter.

6. The filter of claim 1 wherein said particles of an absorptive material are clay particles.

7. A filter for removing condensibles, particulate matter and volatile substances from a gas comprising a composite mixture of aggregate mineral praticles selected from the group consisting of scoria, slag, obsidian and glass, said mineral particles having irregular surfaces including concavities to provide an extended surface over which the gas passes and to collect therefrom condensates and particulate matter and particles of an absorptive material selected from the group consisting of diatomaceous earth, kaolinite clay, montmorillonite clay, bentonite, and a discrete filter pad of the group cellulose and cellulose esters disposed at the downstream side thereof.

8. The filter of claim 6 wherein said aggregate mineral particles and said particles of an absorptive material are bound together with an innocuous organic binder.

9. The filter of claim 6 wherein said filter includes a heat conductive casing disposed about said composite mixture of particles in heat conducting relationship thereto, said casing including an inlet communicating with said composite mixture and an outlet in which said filter pad is disposed.

10. A filter for removing condensables and particulate matter from smoke comprising a composite of aggregate, non-fibrous mineral particles selected from the group consisting of scoria, slag, obsidian and glass, said particles having irregular surfaces including concavities to provide an extended surface over which the smoke passes and to collect from such smoke condensates and particulate matter.

11. The filter of claim 6 wherein a second filter is positioned to intercept the fluid after it has passed through said composite particle filter, said second filter being comprised of fibers of a material selected from the group cellulose and cellulose esters.

12. The filter of claim 8 wherein the proportion of said binder to said composite particles is about two to five percent by volume.

References Cited

UNITED STATES PATENTS

| 1,985,840 | 12/1934 | Sadtler | 131—10.9 |
| 2,108,860 | 2/1938 | Kauffman | 131—17 |
| 2,579,984 | 12/1951 | Trowbridge. | |
| 2,768,913 | 12/1956 | Hiler | 131—10.9 |
| 3,217,715 | 11/1965 | Berger et al. | 131—10.7 |
| 3,251,365 | 5/1966 | Keith et al. | 131—10.9 X |

FOREIGN PATENTS

| 757,841 | 9/1956 | Great Britain. |

LUCIE H. LAUDENSLAGER, *Primary Examiner.*

U.S. Cl. X.R.

131—10, 10.7, 10.9